US008308244B2

(12) United States Patent
Parker et al.

(10) Patent No.: US 8,308,244 B2
(45) Date of Patent: Nov. 13, 2012

(54) APPARATUS FOR RETAINING SEATBELT WEBBING AWAY FROM A SEATBACK SPLIT LINE (75) Inventors: Grey B. Parker, Columbus, OH (US); Eric Daume, Dublin, OH (US); Kelly Whalen, Lewis Center, OH (US)

(73) Assignee: Honda Motor Co., Ltd., Tokyo (JP)

( * ) Notice: Subject to any disclaimer, the term of this patent is extended or adjusted under 35 U.S.C. 154(b) by 184 days.

(21) Appl. No.: 12/873,806

(22) Filed: Sep. 1, 2010

(65) Prior Publication Data
US 2012/0049600 A1 Mar. 1, 2012

(51) Int. Cl.
*B60R 22/03* (2006.01)
(52) U.S. Cl. .................................. 297/481; 297/482
(58) Field of Classification Search ............... 297/378.1, 297/378.12, 481, 482
See application file for complete search history.

(56) References Cited

U.S. PATENT DOCUMENTS

| | | | | |
|---|---|---|---|---|
| 3,279,851 A | * | 10/1966 | Hinchcliff | 297/481 |
| 3,295,862 A | * | 1/1967 | Ebert | 297/481 X |
| 4,118,068 A | * | 10/1978 | Fohl | 297/481 |
| 4,431,233 A | * | 2/1984 | Ernst | 297/481 X |
| 4,635,963 A | | 1/1987 | Higuchi et al. | |
| 4,708,385 A | * | 11/1987 | Kondo | 296/65.17 |
| 4,880,264 A | * | 11/1989 | Yamazaki et al. | 297/378.13 X |
| 4,904,003 A | * | 2/1990 | Yamazaki et al. | 297/378.13 X |
| 4,919,488 A | * | 4/1990 | Deegener et al. | 297/481 X |
| 4,944,530 A | * | 7/1990 | Spurrier | 297/482 X |
| RE34,051 E | * | 9/1992 | Deegener et al. | 297/481 X |
| 5,265,910 A | | 11/1993 | Barr et al. | |
| 5,380,060 A | * | 1/1995 | Sponsler et al. | 297/378.12 X |
| 5,603,550 A | * | 2/1997 | Holdampf et al. | 297/378.12 X |
| 5,662,377 A | * | 9/1997 | Holdampf et al. | 297/378.12 X |
| 6,042,188 A | * | 3/2000 | Gold | 297/481 X |
| 6,230,088 B1 | | 5/2001 | Husby | |
| 6,336,662 B1 | | 1/2002 | Kurita et al. | |
| 6,581,968 B1 | | 6/2003 | Grace et al. | |
| 6,749,038 B2 | | 6/2004 | Sullivan et al. | |
| 6,786,551 B2 | * | 9/2004 | Brewer et al. | 297/378.12 |
| 6,820,903 B2 | * | 11/2004 | Wittenberg | 297/481 X |
| 6,846,020 B2 | | 1/2005 | Xu | |
| 7,104,570 B2 | | 9/2006 | Hearn et al. | |
| 7,458,636 B2 | * | 12/2008 | Chen et al. | 297/481 X |
| 7,469,766 B2 | | 12/2008 | Guo et al. | |
| 7,614,702 B2 | * | 11/2009 | Kubler et al. | 297/378.1 X |
| 7,845,734 B2 | * | 12/2010 | Gomi et al. | 297/481 |
| 7,971,908 B2 | * | 7/2011 | Hathaway et al. | 297/482 X |
| 2004/0140660 A1 | | 7/2004 | Xu | |
| 2008/0093832 A1 | | 4/2008 | Ajisaka | |

* cited by examiner

*Primary Examiner* — Rodney B White
(74) *Attorney, Agent, or Firm* — Rankin, Hill & Clark LLP (57) ABSTRACT

A vehicle seat assembly includes a seatback moveably connected to a seat base. The seatback has an upright position and a folded position. A stationary bolster is located on an outboard lateral side of the seatback. The seatback and the stationary bolster define a seat split line. A seatbelt assembly has a seatbelt webbing and a tongue joined to the seatbelt webbing. A portion of the seatbelt webbing extends along the split line when the seatbelt webbing is in a non-use condition and the seatback is in the upright position. An apparatus connected to at least one of the side bolster and seatbelt assembly retains the seatbelt webbing away from the split line as the seatback is moved between the upright position and the folded position.

9 Claims, 13 Drawing Sheets

APPARATUS FOR RETAINING SEATBELT WEBBING AWAY FROM A SEATBACK SPLIT LINE

BACKGROUND

Exemplary embodiments herein generally relate to a vehicle seat assembly, and more particularly to an apparatus for retaining a seatbelt webbing away from a seat split line as a seatback is moved between an upright position and a folded, stowed position.

Figure 1:
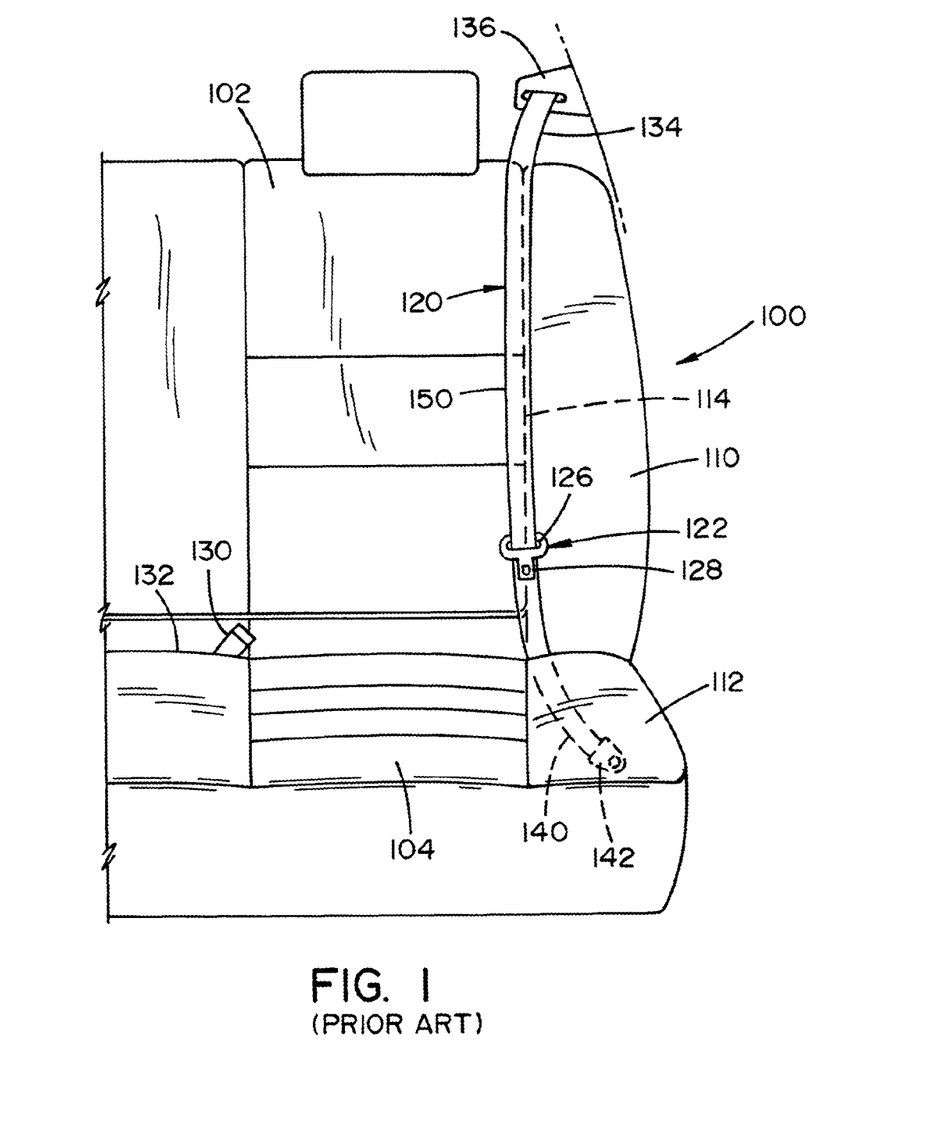
FIG. 1 illustrates a known vehicle seat assembly including a seatback moveably connected to a seat base or cushion, the seatback being in an upright, seated position.
Figure 2:
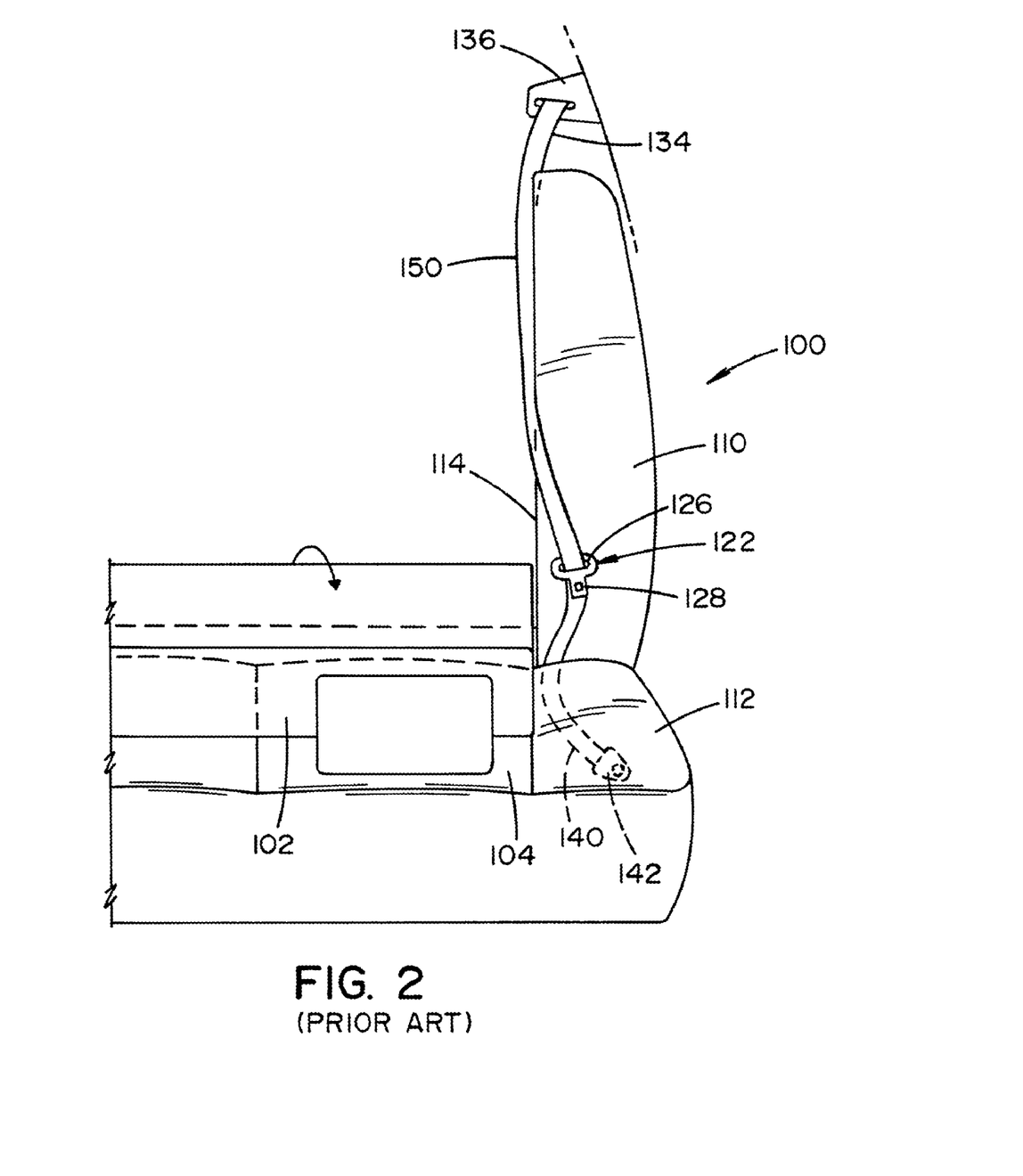
FIG. 2 illustrates the known seat assembly of FIG. 1 with the seatback in a folded, stowed position, a seatbelt webbing being caught in a seat split line between the seatback and a stationary bolster.

As shown in FIGS. 1 and 2, a known vehicle seat assembly 100 includes a seatback 102 moveably connected to a seat base or cushion 104. The seatback 102 can be moved between an upright, seated position (FIG. 1) and a folded, stowed position (FIG. 2) where the seatback rests upon the seat base 104. A stationary bolster 110 and stationary cushion 112 can be provided on the respective outboard lateral sides of the seatback 102 and the seat base 104. The seatback and the stationary bolster define a seat split line 114. The vehicle seat assembly 100 further includes a seatbelt assembly having a seatbelt webbing 120 and a seatbelt latch or tongue 122 joined to the seatbelt webbing via a webbing loop 126, through which the webbing 120 is threaded. A tongue plate 128 is selectively engaged by a belt buckle 130 anchored to a lower portion of a vehicle body structure on an inboard side of an occupant and projecting outwardly from the seat bight 132. An upper portion 134 of the webbing extends through a web guide 136 secured to an upper portion of the vehicle body structure and further extends to a seatbelt retractor (not shown). A lower portion 140 of the webbing 120 is fixedly secured to the vehicle body structure via an anchor 142 located on an outboard side of the cushion 112. A shoulder portion 150 of the seatbelt webbing 120 extends along the seat split line 114 when the seatbelt webbing is in a non-use condition and the seatback 102 is in the upright position.

With such a known vehicle seat configuration, the seatbelt webbing 120 and tongue 122 of the seatbelt assembly can overlap or cross the seat split line 114 between the seatback 102 and the outer side bolster 110. This can present a problem as the seatback 102 is moved between the upright position and the folded position in that the seatbelt webbing 120 and tongue 122 can be caught in the split line 114, as depicted in FIG. 2.

BRIEF DESCRIPTION

In accordance with one aspect, a vehicle seat assembly comprises a seatback moveably connected to a seat base. The seatback has an upright position and a folded position. A stationary bolster is located on an outboard lateral side of the seatback. The seatback and the stationary bolster define a seat split line. A seatbelt assembly has a seatbelt webbing and a tongue joined to the seatbelt webbing. A portion of the seatbelt webbing extends along the split line when the seatbelt webbing is in a non-use condition and the seatback is in the upright position. An apparatus connected to at least one of the side bolster and seatbelt assembly retains the seatbelt webbing away from the split line as the seatback is moved between the upright position and the folded position.

In accordance with another aspect, a vehicle seat assembly comprises a seatback moveably connected to a seat base. The seatback has an upright position and a folded position. A stationary bolster is located on an outboard lateral side of the seatback. The seatback in the upright position and the stationary bolster define a seat split line. A stationary seat cushion is located on an outboard lateral side of the seat base. A seatbelt assembly has a seatbelt webbing and a tongue joined to the seatbelt webbing. The seatbelt webbing is located adjacent the split line when the seatbelt webbing is in a non-use condition and the seatback is in the upright position. Means for retaining the seatbelt webbing and tongue away from the split line as the seatback is moved between the upright position and the folded position is provided on at least one of the bolster, cushion and seatbelt assembly.

DETAILED DESCRIPTION

It should, of course, be understood that the description and drawings herein are merely illustrative and that various modifications and changes can be made in the structures disclosed without departing from the present disclosure. It will also be appreciated that the various identified components of the exemplary seatbelt webbing retaining apparatus disclosed herein are merely terms of art that may vary from one manufacturer to another and should not be deemed to limit the present disclosure.

Figure 3:
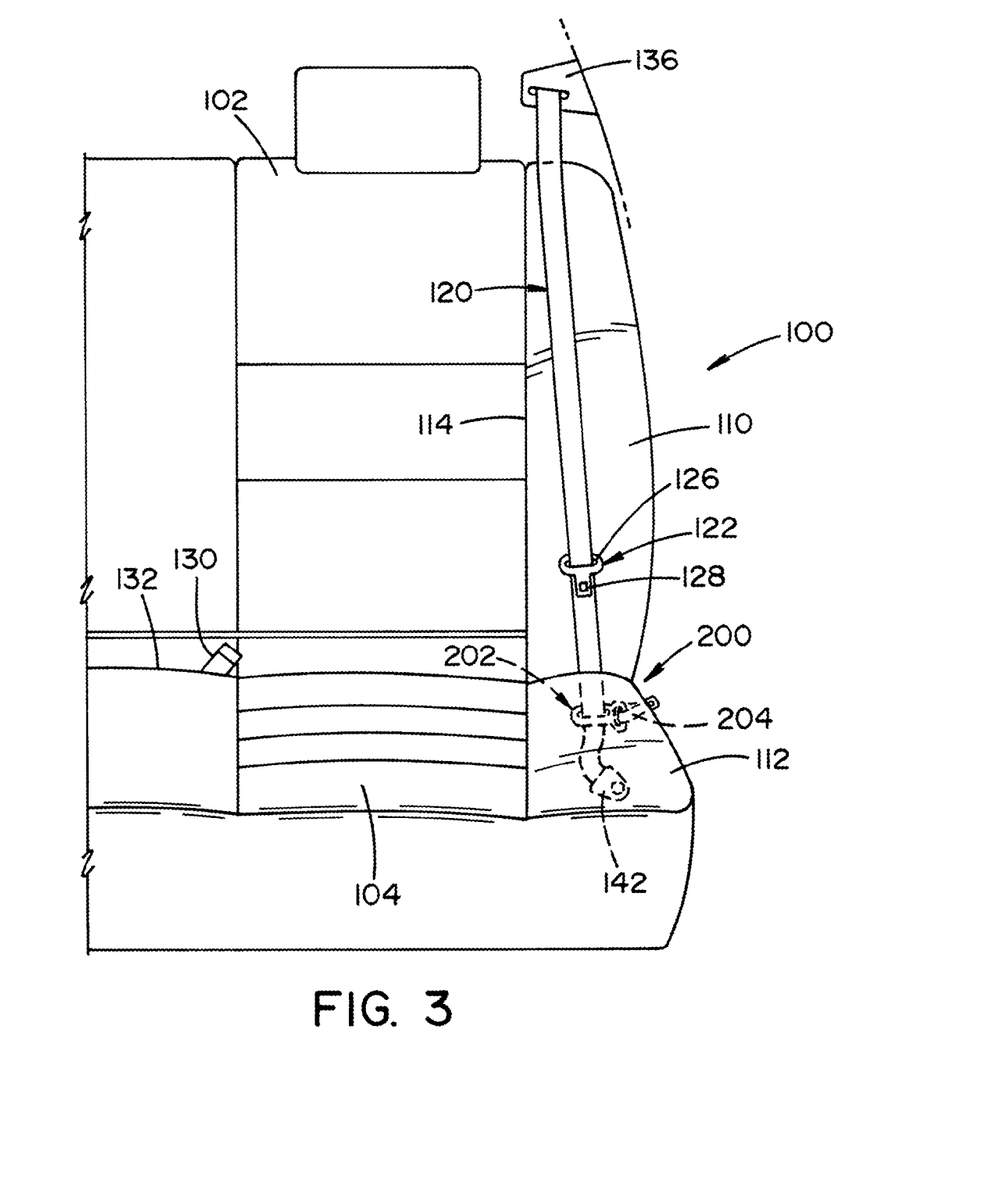
FIG. 3 depicts a seat assembly having an apparatus for retaining the seatbelt webbing away from the seat split line as the seatback is moved between the upright position and stowed position according to one exemplary aspect of the present disclosure.
Figure 4:
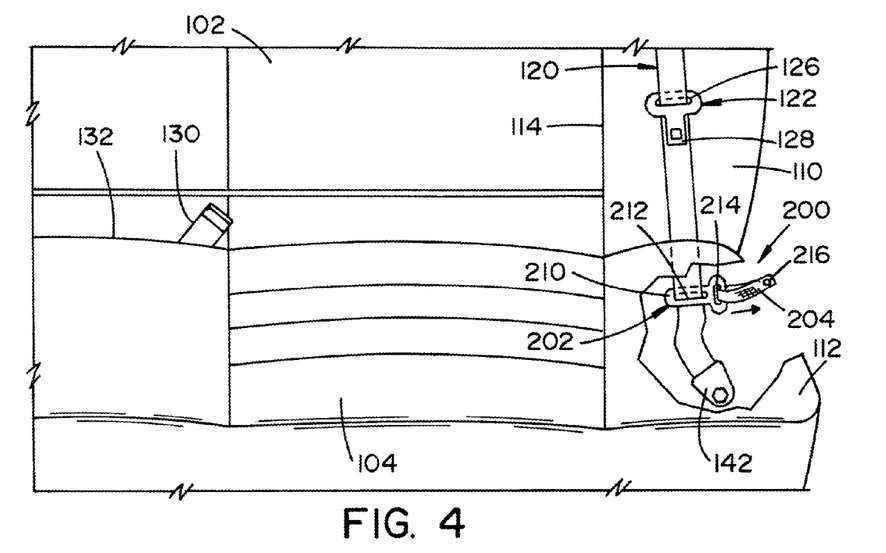
FIGS. 4 and 5 are enlarged views, partially broken away, of the apparatus of FIG. 3.
Figure 5:
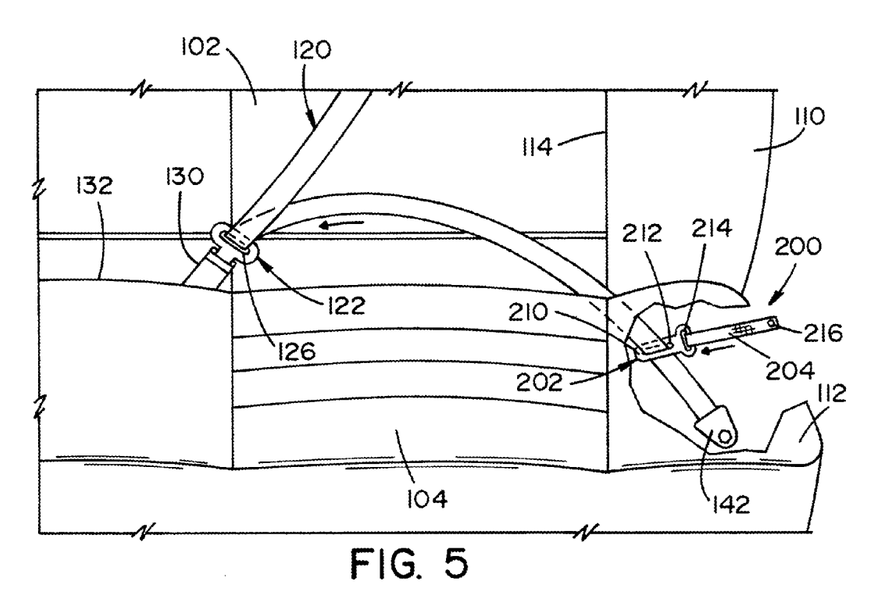

Referring now to the drawings, wherein like numerals refer to like parts throughout the several views, FIGS. 3-5 illustrate the seat assembly 100 having an apparatus 200 for retaining the seatbelt webbing 120 away from the seat split line 114 as the seatback 102 is moved between the upright position and stowed position according to one exemplary aspect. As set forth previously, the seat assembly 100 includes the seatback 102 moveably connected to the seat base 104. The stationary bolster 110 and stationary cushion 112 are provided on the respective outboard lateral sides of the seatback 102 and the seat base 104. The seatback and the stationary bolster define the seat split line 114. The seatbelt webbing retaining apparatus 200 is connected to at least one of the stationary side bolster 110, cushion 112 and seatbelt assembly. In the depicted exemplary embodiment, the seatbelt retaining apparatus 200 is provided on the stationary cushion 112 and is generally hidden from view of the vehicle occupant. This allows the seatbelt webbing 120 to be moved away from the seat back split line 114 as the seatback 102 is being moved by controlling the seatbelt webbing 120 in a lower non-visible area of the seat assembly 100.

As shown in FIGS. 4 and 5, the exemplary apparatus 200 is configured to continuously bias the seatbelt webbing 120 away from the split line 114 as the seatback 102 is moved between the upright position and the stowed position. The seatbelt webbing retaining apparatus 200 comprises a clip or guide 202 connected to the seatbelt webbing 120 and a biasing member 204 for connecting the guide to a vehicle body structure located on an outboard side of the stationary cushion 112. The guide includes a body 210 having a first elongated opening or webbing loop 212 for threadingly receiving the seatbelt seating 120. The body 210 can include a slit (not shown) extending through the body which allows the seatbelt webbing to be positioned within the first elongated opening 212. A second elongated opening or a loop 214 is provided on an outboard side of the body 210 for receiving the biasing member 204. In the depicted embodiment, the biasing member 204 is a flexible, elastic band which can be connected to the body 210 by threading the elastic member through the second elongated opening 214. The opposed ends of the elastic band can then be secured together via a pin 216, which can also be used for securing the apparatus 200 to the vehicle body structure. Although, it should be appreciated that alternative configurations of the biasing member are contemplated for biasing the guide 202 toward the outboard side of the seat cushion 112.

The biasing member 204 provides a biasing force toward the outboard side of the stationary cushion 112, which, in turn, retains the seatbelt webbing 120 away from the split line 114. This allows the seatback 102 to be moved between the upright position and the folded position without concern of the seatbelt webbing 120 and seatbelt latch or tongue 122 being caught in the split line 114. When the seatbelt webbing 120 is being used by an occupant and the tongue 122 is engaged within the buckle 130, the biasing member 204 allows the guide 202 to move toward the inboard side of the stationary cushion 112 thereby allowing full use of the seatbelt assembly by the occupant. It should be appreciated that the biasing member 204 can connect the guide 202 directly to the stationary cushion 112. For example, the biasing member 204 can be anchored to the cushion 112 on the outboard side of the cushion at a predetermined location which allows full use of the seatbelt assembly while still maintaining the aesthetics of the seat assembly 100. Instead of having opposed ends connected via the pin 216, the opposed ends of the biasing member 204 can be separately secured to one of the vehicle body structure and the cushion 112. With this configuration, the biasing member 204 has a strap-like configuration and the guide 202 can be secured to the biasing member by providing a slit through the body 210 which is in communication with the second elongated opening 214. The biasing member 204 can be threaded through the slit and received in the second elongated opening 214.

Figure 6:
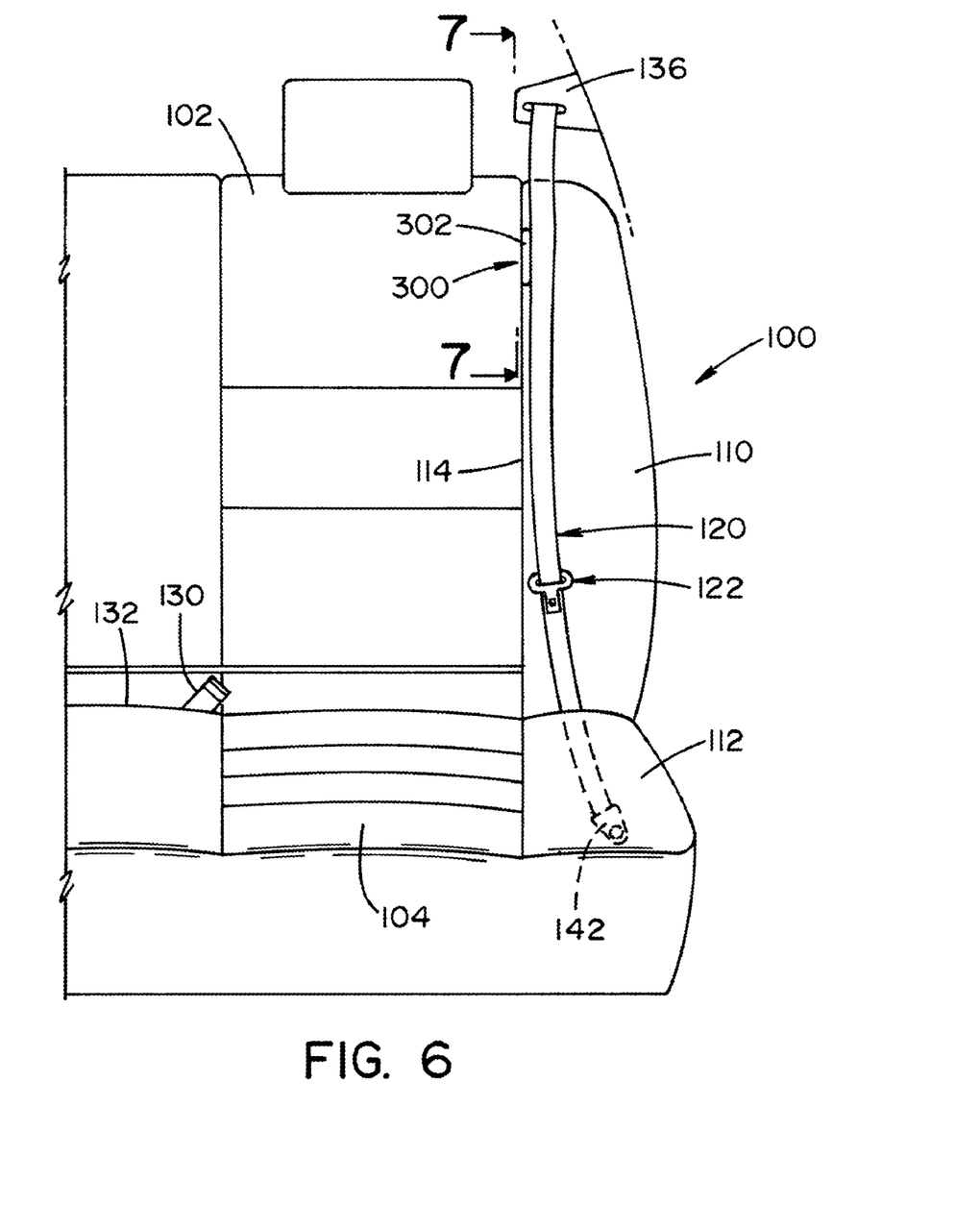
FIG. 6 depicts a seat assembly having a seatbelt webbing retaining apparatus according to another exemplary aspect of the present disclosure.
Figure 7:
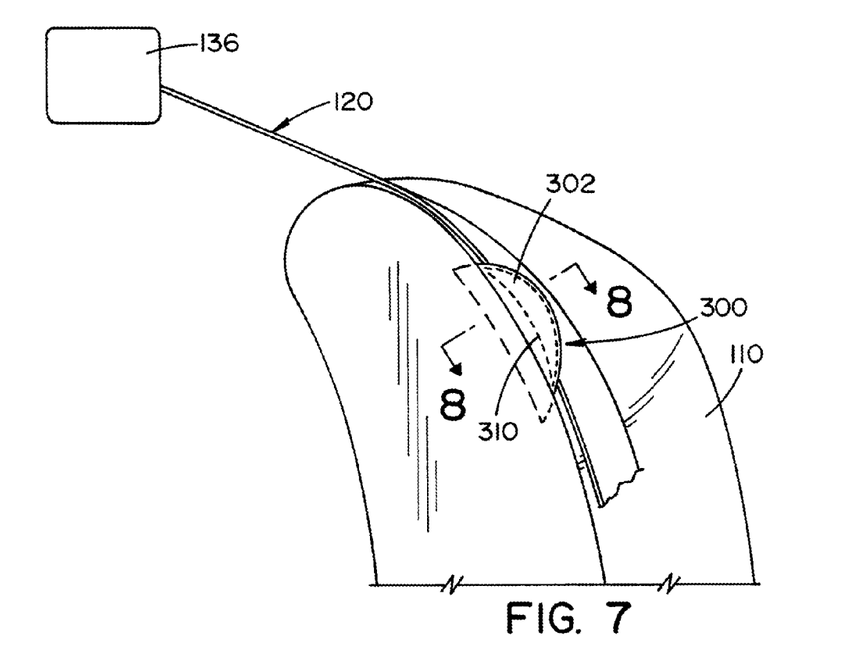
FIG. 7 is a view of the apparatus of FIG. 6 taken generally along line 7-7 of FIG. 6.
Figure 8:
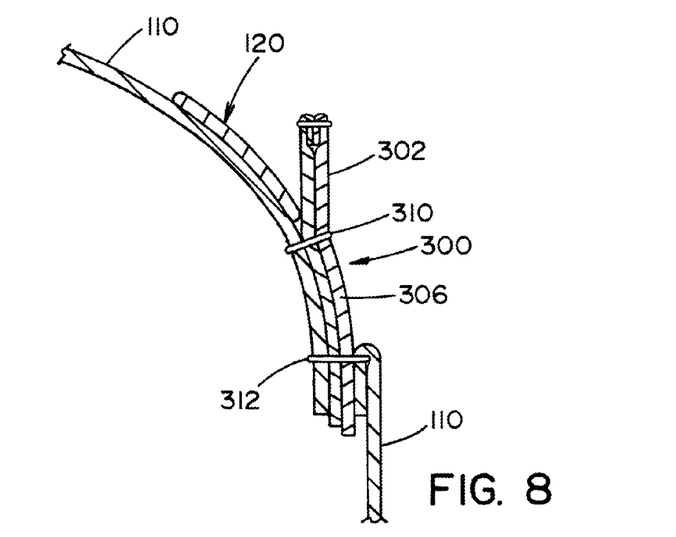
FIG. 8 is a cross-sectional view of FIG. 7 taken generally along line 8-8 of FIG. 7.

With reference to FIGS. 6-8, a seatbelt webbing retaining apparatus 300 according to another exemplary aspect of the present disclosure for retaining the seatbelt webbing 120 away from the seat split line 114 is illustrated. The seatbelt webbing retaining apparatus 300 includes a stopper member 302 secured to and projecting away from an upper portion of the stationary side bolster 110 adjacent the split line 114. In the depicted embodiment, the stopper member 302 is formed by a fabric member 306 which is folded over itself to provide a double thickness for increased strength and rigidity. The folded over fabric 306 is then secured to the seatback 102 via a first attachment member 310 and then to both the stationary side bolster 110 and the seatback 102 via a second attachment member 312. The folded over fabric member 306 projects outwardly a pre-determined distance to define the stopper member 302 which prevents the seatbelt webbing 120 from crossing the seatback split line 114 in the non-use position as the seatback 102 is moved between the upright position and the stow position. The stopper member 302 can be incorporated into the overall seat image without affecting the aesthetics of the seat assembly 100.

Figure 9:
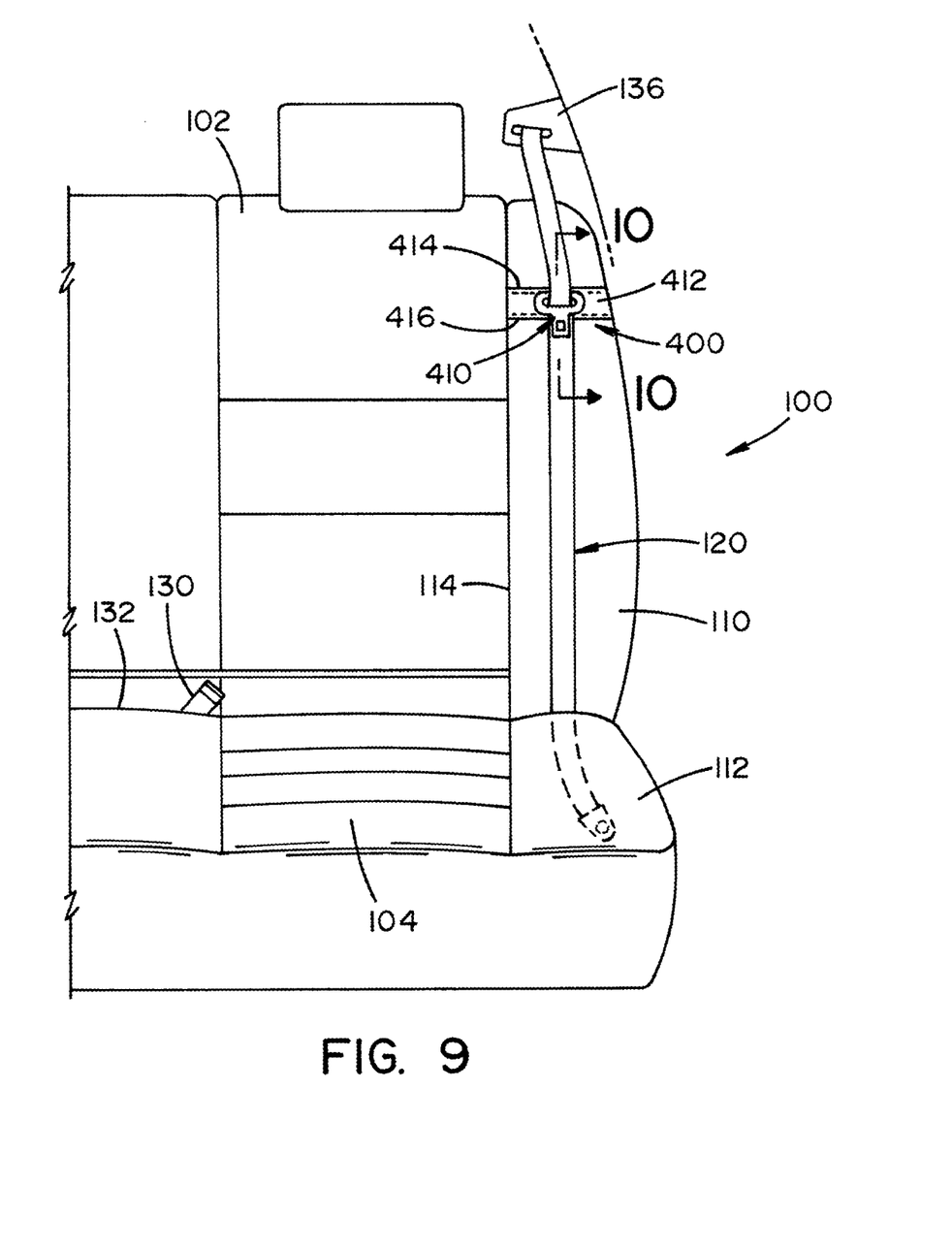
FIG. 9 depicts a seat assembly having a seatbelt webbing retaining apparatus according to yet another exemplary aspect of the present disclosure.
Figure 10:
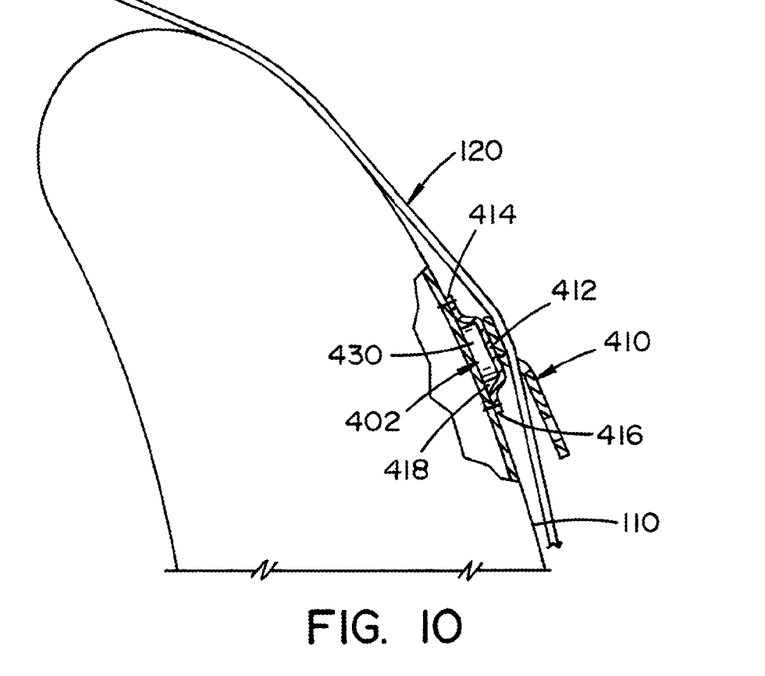
FIG. 10 is a cross-sectional view of the apparatus of FIG. 9 taken generally along line 10-10 of FIG. 9 according to one embodiment.
Figure 11:
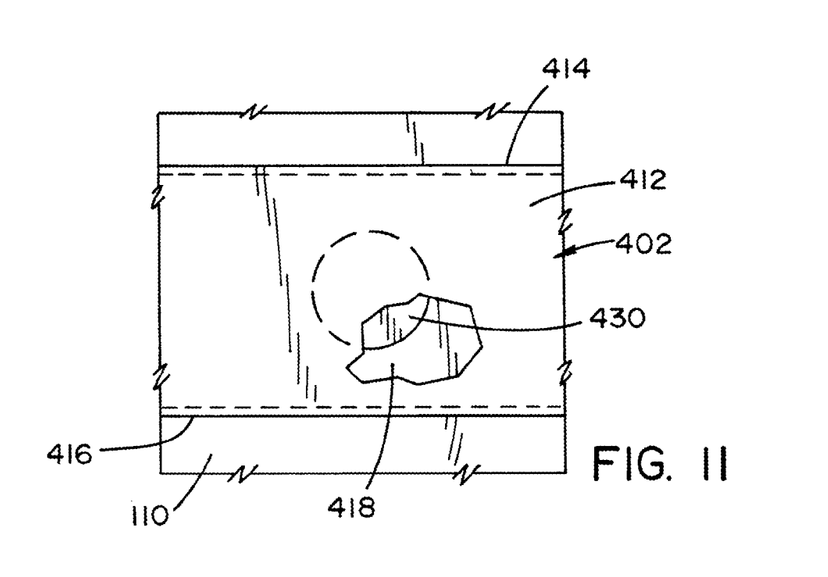
FIG. 11 is an enlarged view of a strap, partially broken away, of the apparatus of FIG. 9 according to the embodiment of FIG. 10.
Figure 12:
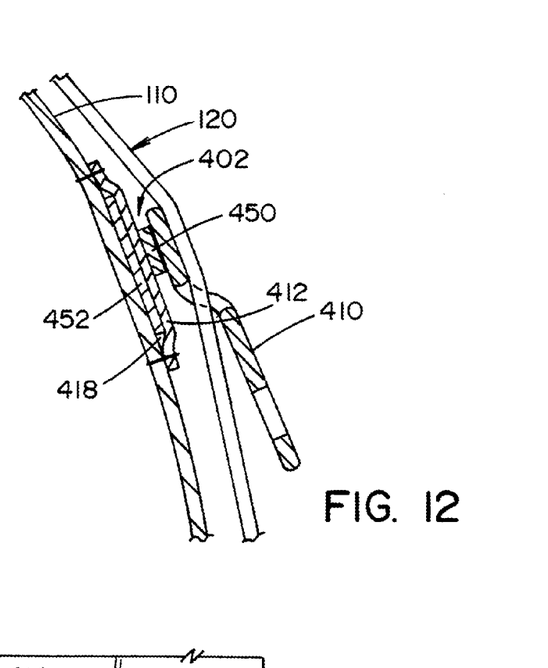
FIG. 12 is a cross-sectional view of the apparatus of FIG. 9 taken generally along line 10-10 of FIG. 9 according to another embodiment.
Figure 13:
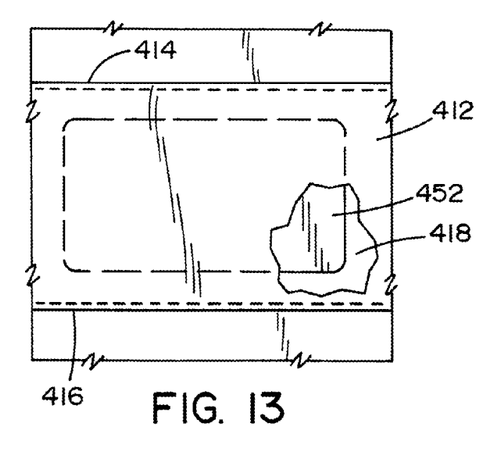
FIG. 13 is an enlarged view of a strap, partially broken away, of the apparatus of FIG. 9 according to the embodiment of FIG. 12.
Figure 14:
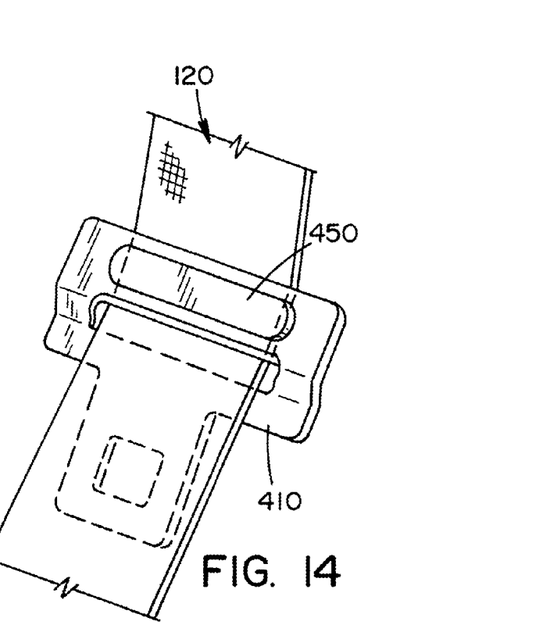
FIG. 14 is an enlarged view of a seatbelt latch or tongue of the apparatus of FIG. 9 according to the embodiment of FIG. 12.
Figure 15:
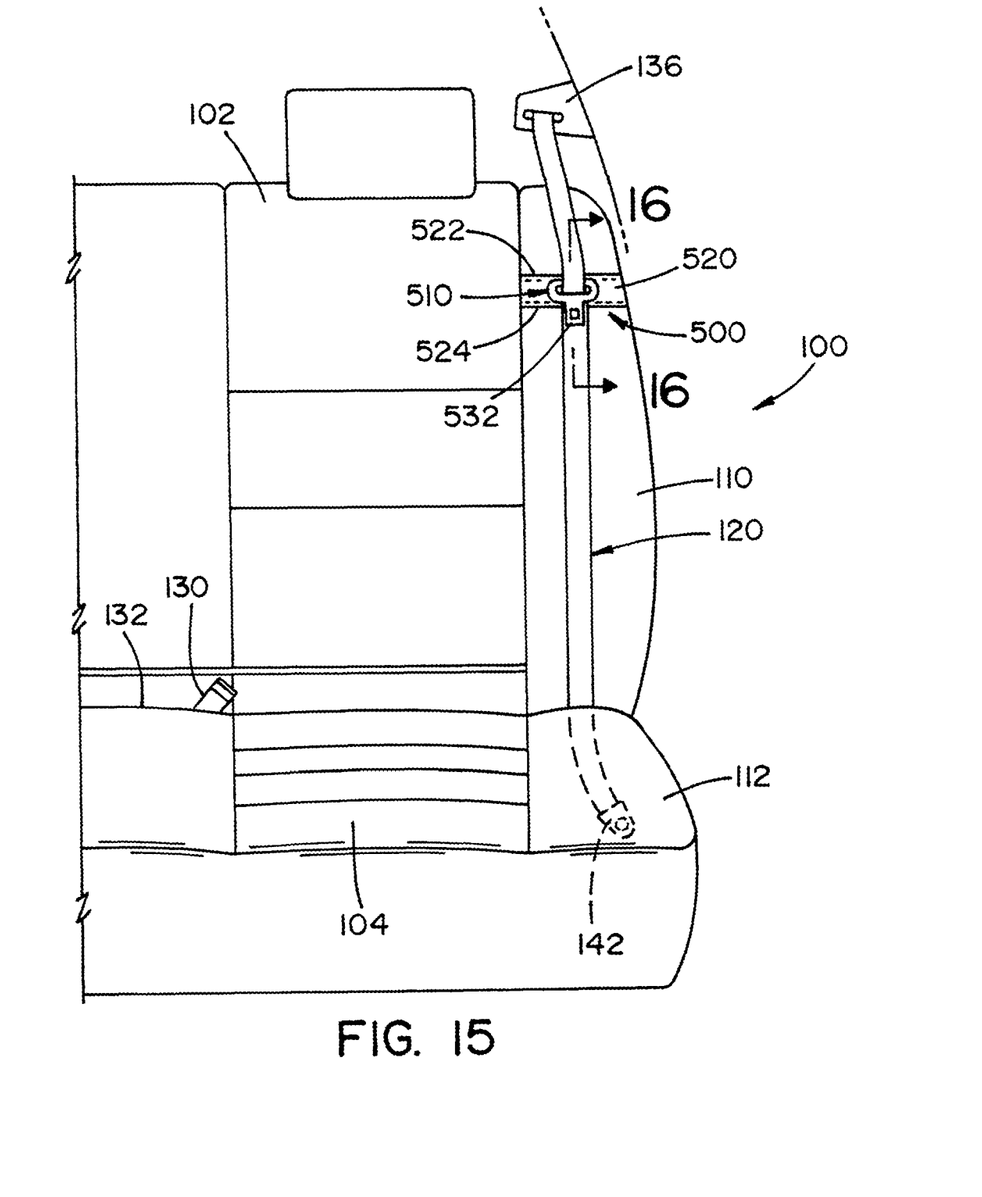
FIG. 15 depicts a seat assembly having a seatbelt webbing retaining apparatus according to still yet another exemplary aspect of the present disclosure.
Figure 16:
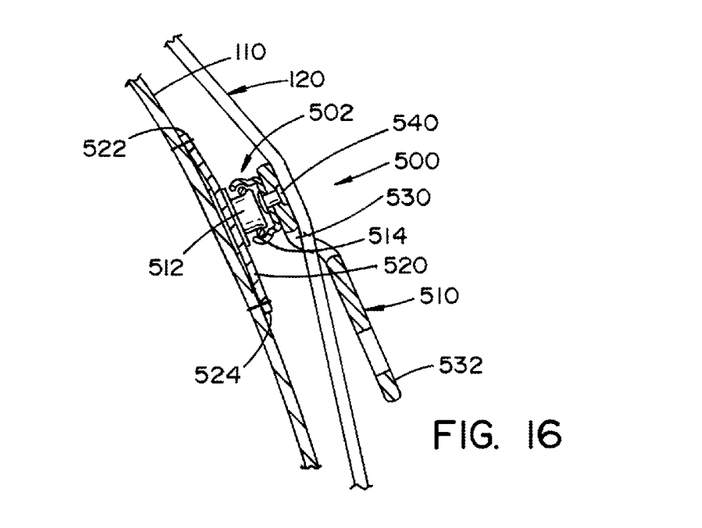
FIG. 16 is a cross-sectional view of the apparatus of FIG. 15 taken generally along line 16-16 of FIG. 15.
Figure 17:
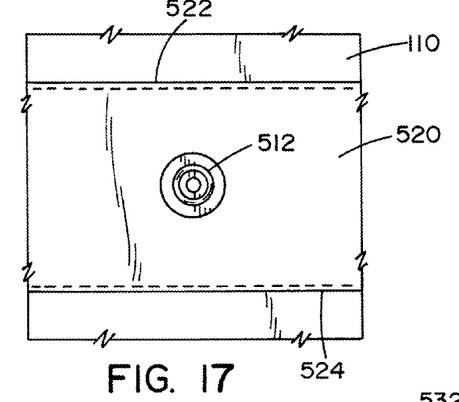
FIGS. 17 and 18 are enlarged views of a respective strap and a seatbelt latch or tongue of the apparatus of FIG. 15.
Figure 18:
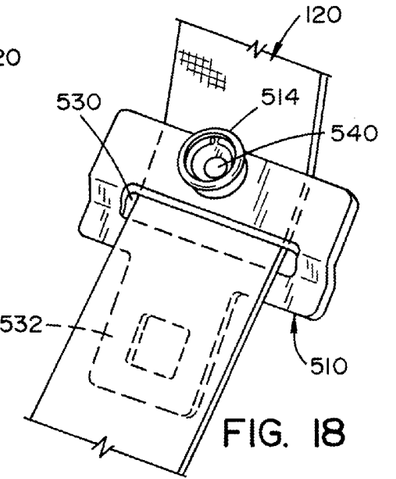
Figure 19:
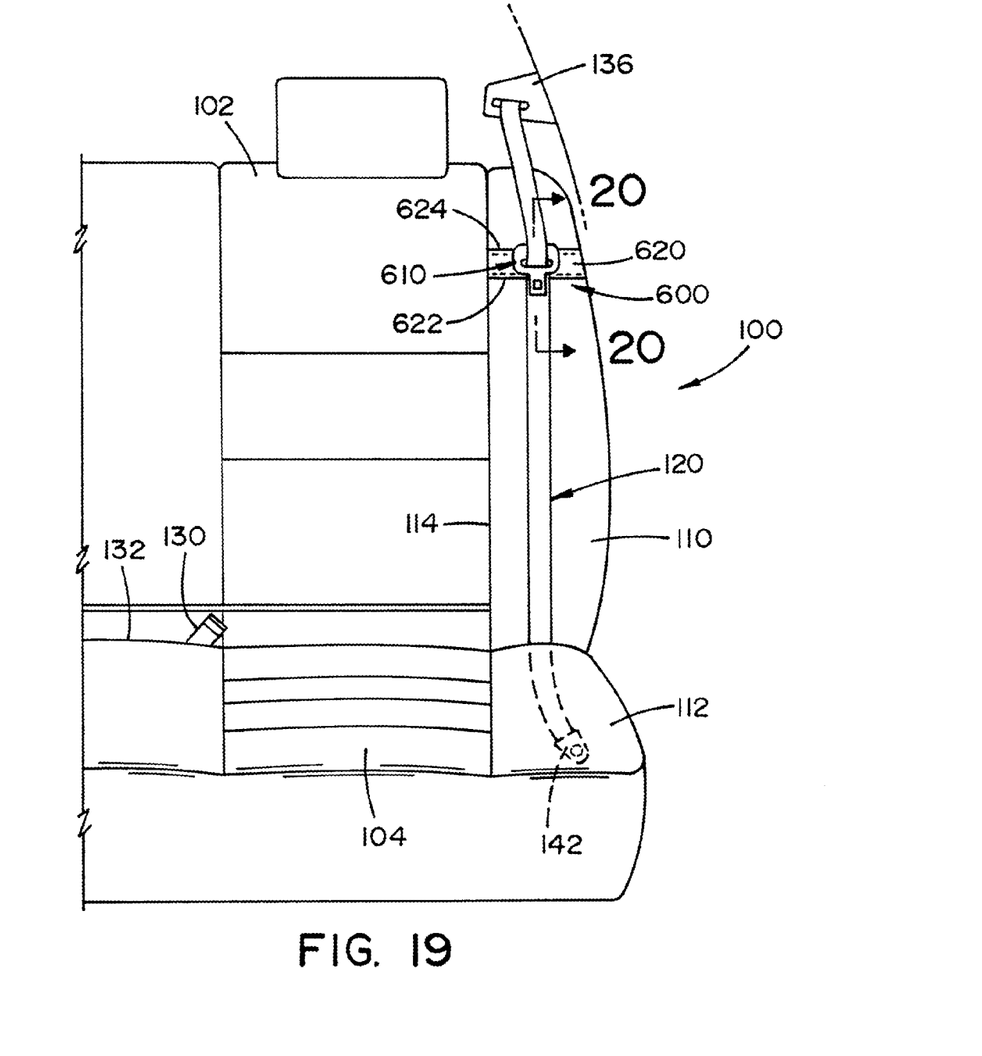
FIG. 19 depicts a seat assembly having a seatbelt webbing retaining apparatus according to still yet another exemplary aspect of the present disclosure.
Figure 20:
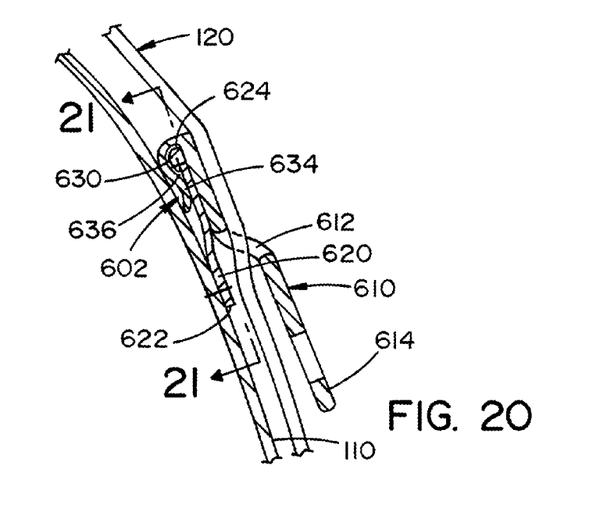
FIG. 20 is a cross-sectional view of the apparatus of FIG. 16 taken generally along line 20-20 of FIG. 19.
Figures 21, 22:
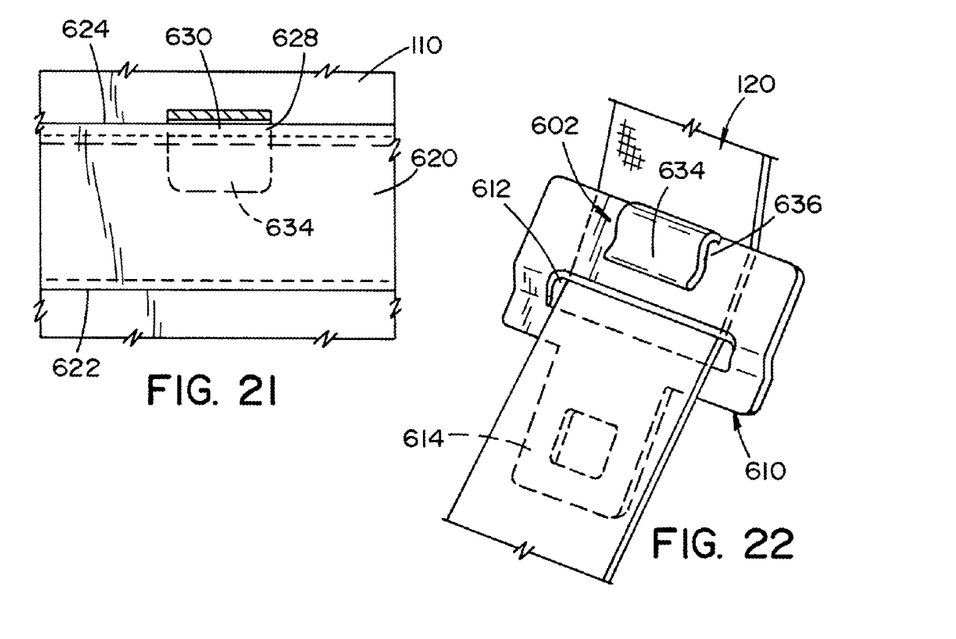
FIGS. 21 and 22 are enlarged views of a respective strap and a seatbelt latch or tongue the apparatus of FIG. 19.

With reference to FIG. 9, an apparatus 400 according to another aspect of the present disclosure for retaining the seatbelt webbing 120 away from the split line 114 is shown. The seatbelt webbing retaining apparatus 400 includes a magnet assembly 402 for releasably mounting a seatbelt latch or tongue 410 to the side bolster 110. Particularly, the side bolster 110 includes a strap 412 which extends between the inboard side and the outboard side of the side bolster. Opposed sides 414, 416 of the strap are secured to the side bolster. Thus, the inner surface of the strap and the outer surface of the side bolster together define a pocket 418. In the depicted exemplary embodiment of FIGS. 10 and 11, the magnet assembly 402 includes a magnet 430 that is positioned within the pocket of the strap 412. Opposed ends (not shown) of the strap are then secured to the inboard and outboard side of the side bolster 110 to prevent the magnet from escaping the pocket 418. At least a portion of the tongue 410 can be formed of a ferromagnetic material which allows the tongue to be attached to the magnet 430. In use, prior to the seatback 102 being moved from the upright position to the stowed position, an occupant moves the seatbelt webbing 120 away from the split line 114 by connecting the tongue 410 to the magnet 430. In the depicted exemplary embodiment of FIGS. 12-14, the magnet assembly 402 includes a magnet 450 connected to the tongue 410. With this configuration, a separate steel insert 452 (or other magnetic material) can be provided in the pocket 418 of the strap 412. To move the seatbelt webbing 120 away from the split line 114, the magnet 450 located on the tongue 410 can be connected to the steel insert 452.

With reference now to FIGS. 15-18, an apparatus 500 for retaining the seatbelt webbing 120 away from the split line 114 according to still yet another exemplary aspect of the present disclosure is illustrated. The seatbelt webbing retaining apparatus 500 includes a snap assembly 502 for releasably mounting a seat belt latch or tongue 510 to the stationary side bolster 110. The snap assembly 502 includes a male snap 512 connected to one of the side bolster 110 and the tongue 510 and a female snap 514 connected to the other of the side bolster and the tongue. As shown, the male snap 512 is connected to the stationary side bolster 110 and the female snap 514 is connected to the tongue 510. Particularly, a strap 520 extends between an inboard and an outboard side of the side bolster 110. Opposed sides 522, 524 of strap 520 can be fixed or sewn to the side bolster 110 to maintain the overall aesthetic appearance of the side bolster. In the case of a leather side bolster, the sides 522, 524 of the strap 520 can be bonded to the side bolster 110 by, for example, an adhesive. The male snap 512 is fixedly secured to the strap 520. The tongue 510 is joined to the seatbelt webbing 120 via a webbing loop 530 through which the webbing is threaded. A tongue plate 532 is provided on one side of the webbing loop 530 and the female snap 514 is provided on the other side of the webbing loop. This prevents the female snap 514 from interfering with the seatbelt buckle 130 as the tongue plate 532 is engaged by the belt buckle 130. In use, prior to the seat back 102 being moved between the upright position and the stowed position, the user can snap the tongue 510 to the strap 520. This, in turn, moves the seatbelt webbing 120 away from the split line 114 so that the webbing does not get caught in the split line as the seat back 102 is being moved. The female snap 514 can be secured to the tongue 510 via a fastener 540, such as a rivet, or can be directly molded to the tongue as an insert to form a unitary body.

With reference to FIGS. 19-22, an apparatus 600 for retaining the seatbelt webbing 120 away from the seat split line 114 according to still yet another exemplary aspect of the present disclosure is illustrated. The seatbelt webbing retaining apparatus 600 includes a hook assembly 602 for releasably mounting a tongue 610 to the side bolster 110. Similar to the previous embodiments, the tongue 610 is joined to the seatbelt webbing 120 via a webbing loop 612, through which the webbing is threaded. A tongue plate 614 is provided for selectively engaging the tongue to the belt buckle 130. A strap 620 is secured to the side bolster 110 and extends between an inboard side and an outboard side of the side bolster 110. A lower side 622 of the strap 620 is fixed or sewn to the side bolster 110. In the case of a leather side bolster, the side 622 of the strap can be bonded to the side bolster by, for example, an adhesive. An upper side 624 of the strap 620 can be at least partially secured to the side bolster. Particularly, a center portion 628 of the upper side 624 is folded over to define a lip 630. End portions of the side upper 624 can be secured to the side bolster 110 in a similar manner as lower side 622 or can also be folded over similar to the center section. The tongue 610 includes a generally hooked-shape member 634 which can be integrally formed on the tongue. The side bolster 110 has an attachment portion defined by the center portion 628 of the strap 620 which is configured to be engaged by the hook-shape member 634 of the tongue. Particularly, the hook-shaped member 634 defines a pocket 636 dimensioned to receive the lip 630. To releasably secure the tongue 610 to the strap 620, the hook-shaped member 634 of the tongue 610 is received over the lip 630 and is slid in between the side bolster 110 and the strap 620. This moves the seatbelt webbing 120 away from the split line 114, which then allows the seat back 102 to be moved between the upright position and the stow position without the seatbelt webbing 120 being caught in the split line 114.

As evident from the foregoing, the present disclosure provides various manners for retaining the seatbelt webbing 120 away from the seat split line 114 to prevent the webbing from being caught in the split line as the seat back 102 is being moved between the seated and stowed positions. According to one aspect, a clip including the guide 202 is provided in the area between the side bolster 110 and the stationary cushion 112. The webbing 120 can be threaded through the web guide 202 and the elastic member 204 can be attached to the guide to retain the guide in place. The elastic member allows full use of the seatbelt webbing by allowing the guide to move with the webbing as it is being used by an occupant. According to another aspect, the stopper member or tab 302 is secured to the inboard side of the side bolster 110 to prevent the webbing 120 from crossing the split line 114 in the non-use position. The stopper member 302 is incorporated into the overall seat image for aesthetic purposes. According to yet another aspect, a strap 412, 520, 620, is secured to the side bolster 110. The strap 412 can house a steel insert and the tongue can include a magnet for securing the tongue to the strap in the non-use position. Alternatively, the strap 412 can house the magnet and the tongue can include a steel insert or can be made from a ferromagnetic material. The strap 520 can include a male snap 512 and the tongue can include the female snap 514 so that the tongue can be snapped to the strap to retain the webbing away from seat back split line 114. Moreover, the tongue can include a molded-in hook 634 for securing the tongue to the strap 620 in the non-use position. In each of the exemplary aspects described above, the seatbelt webbing 120 is prevented from overlapping or crossing over the seat split line 114 which prevents the seatbelt webbing from being caught in the split line 114 as the seat back 102 is moved between the upright position and the folded stowed position.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle seat assembly comprising:
   a seatback moveably connected to a seat base, the seatback having an upright position and a folded position;
   a stationary side bolster located on an outboard lateral side of the seatback, the seatback and the stationary bolster defining a split line;
   a seatbelt assembly having a seatbelt webbing and a tongue joined to the seatbelt webbing, a portion of the seatbelt webbing extending along the split line when the seatbelt webbing is in a non-use condition and the seatback is in the upright position; and
   an apparatus connected to at least one of the side bolster and seatbelt assembly for retaining the seatbelt webbing away from the split line as the seatback is moved between the upright position and the folded position,
   wherein the apparatus includes a stopper member provided on and projecting away from the side bolster adjacent the split line.

2. The vehicle seat assembly of claim 1, wherein a portion of the stopper member is secured to an inboard side of the side bolster.

3. A vehicle seat assembly comprising:
   a seatback moveably connected to a seat base, the seatback having an upright position and a folded position;

a stationary side bolster located on an outboard lateral side of the seatback, the seatback in the upright position and the stationary bolster defining a split line;

a stationary seat cushion located on an outboard lateral side of the seat base;

a seatbelt assembly having a seatbelt webbing and a tongue joined to the seatbelt webbing, the seatbelt webbing being located adjacent the split line when the seatbelt webbing is in a non-use condition and the seatback is in the upright position; and means for retaining the seatbelt webbing and tongue away from the split line as the seatback is moved between the upright position and the folded position provided on at least one of the bolster, cushion and seatbelt assembly, wherein the means for retaining includes strap secured to the side bolster, the strap and tongue being configured such that the tongue is releasably connected to the strap when the seatbelt webbing is in the non-use position.

4. The vehicle seat assembly of claim 3, wherein the strap includes one of a male snap and female snap and the tongue includes the other of the male snap and female snap, the tongue being snapped to the strap to retain the seatbelt webbing away from the seat back split line.

5. The vehicle seat assembly of claim 3, wherein the strap includes a steel insert and the tongue includes a magnet for securing the tongue to the strap in the non-use position.

6. The vehicle seat assembly of claim 3, wherein the strap includes a magnet and at least a portion of the tongue is formed of a ferromagnetic material for securing the tongue to the magnet.

7. The vehicle seat assembly of claim 3, wherein the tongue includes a generally hook-shaped member for releasably engaging the strap in the non-use position.

8. The vehicle seat assembly of claim 7, wherein hook-shaped member is integrally formed with the tongue.

9. A vehicle seat assembly comprising:

a seatback moveably connected to a seat base, the seatback having an upright position and a folded position;

a stationary side bolster located on an outboard lateral side of the seatback, the seatback in the upright position and the stationary bolster defining a split line;

a stationary seat cushion located on an outboard lateral side of the seat base;

a seatbelt assembly having a seatbelt webbing and a tongue joined to the seatbelt webbing, the seatbelt webbing being located adjacent the split line when the seatbelt webbing is in a non-use condition and the seatback is in the upright position; and means for retaining the seatbelt webbing and tongue away from the split line as the seatback is moved between the upright position and the folded position provided on at least one of the bolster, cushion and seatbelt assembly, wherein the means for retaining includes a guide provided in between the side bolster and the stationary cushion, the guide being connected to the seatbelt webbing and configured to continuously bias the seatbelt webbing away from the split line, wherein the seatbelt webbing can be moved away from the split line by controlling the seatbelt webbing in a lower non-visible area of the seat assembly, wherein the guide includes a body having an opening for threadingly receiving the seatbelt webbing, a clip extending from the body, and a biasing member connected to the clip and one of the side bolster and stationary cushion.

* * * * *